United States Patent [19]

Sangster

[11] Patent Number: 4,609,358
[45] Date of Patent: Sep. 2, 1986

[54] VIDEO TRAINING SYSTEM FOR SIMULATANEOUSLY TRAINING A PLURALITY OF STUDENTS

[76] Inventor: Bruce F. Sangster, 6120 Marina Pacific South, Long Beach, Calif. 90803

[21] Appl. No.: 574,672

[22] Filed: Jan. 27, 1984

Related U.S. Application Data

[63] Continuation-in-part of Ser. No. 277,808, Jun. 26, 1981, abandoned.

[51] Int. Cl.$^4$ .................................................. G09B 7/04
[52] U.S. Cl. ...................................... 434/307; 434/323; 434/336; 434/350; 350/96.23; 340/825.08; 358/901; 358/342
[58] Field of Search .............................. 434/307–310, 434/319–321, 323, 335, 315, 316, 336, 337, 350, 351; 273/DIG. 28; 350/96.1, 96.23, 96.24, 96.2; 358/901, 285; 355/1; 340/347 DD, 825.08; 364/515

[56] References Cited

U.S. PATENT DOCUMENTS

| | | | |
|---|---|---|---|
| 4,052,798 | 10/1977 | Tomita et al. | 434/336 |
| 4,320,256 | 3/1982 | Freeman | 434/335 |
| 4,333,152 | 6/1982 | Best | 434/323 |
| 4,490,810 | 12/1984 | Hon | 434/308 |

FOREIGN PATENT DOCUMENTS

2120507  11/1983  United Kingdom ....... 273/DIG. 28

OTHER PUBLICATIONS

*Interactive Videodisc Systems for Education,* Patent Association Literature, 1975, pp. 949–953, vol. 84, No. 12.
*Optical Fiber Transmission for High–Definition TV Signals,* Kumada & Mitsuhashi, 1978, NHK Laboratories Note, Serial No. 228, S91160085.

*Primary Examiner*—Richard C. Pinkham
*Assistant Examiner*—MaryAnn Stoll Lastova
*Attorney, Agent, or Firm*—Spensley Horn Jubas & Lubitz

[57] ABSTRACT

A system for simultaneously interactively training a plurality of students at student stations which may be remote from one another is described. A videodisc player capable of accessing any portion of a videodisc on which has been recorded instructional materials is coupled to a television monitor at each student station. Each student station also comprises a microcomputer into which the student inputs his or her response to the situations presented on the television monitor by the videodisc player. In one embodiment, selected video signals from the videodisc on the videodisc player are digitized and stored in a computer memory. These stored video signals may represent simulated outcomes corresponding to the reponses of the students. Thereafter, the different responses of the students cause either the video signals stored in the computer memory to be converted into analog format and applied to the appropriate television monitors, or causes the videodisc player to access an appropriate portion of the videodisc. A multiport transmitter controllable by signals from the microcomputers results in the appropriate video signals being applied to the appropriate television monitors. In the present invention, fiber optic video links between the videodisc player and the television monitors permit interference-free transmission even within structures or in an industrial area in which the students are remotely located from one another and from the videodisc player.

5 Claims, 2 Drawing Figures

VIDEO TRAINING SYSTEM FOR SIMULATANEOUSLY TRAINING A PLURALITY OF STUDENTS

BACKGROUND OF THE INVENTION

1. Reference to Earlier Application

This application is a continuation-in-part of the now abandoned application Ser. No. 277,808, filed on June 26, 1981 by the same inventor.

2. Field of the Invention

This invention relates to the field of interactive training devices of the type which permits a student to respond to a simulated situation on a video display terminal and to view the simulated result of that response on the same display terminal. It also relates to devices of the type which permit different students to interact with one another during the training process.

3. Prior Art

The age-old method of interactively training students by means of a human instructor in a classroom situation, when used in an industrial or other work setting, often suffers from a number of serious drawbacks, not the least of which is that the students do not always effectively implement the concept taught when they return to their work environment.

Products using video cassettes and video cassette players, and more recently videodiscs and videodisc players, have also been used in some situations to provide training and educational material in place of the human instructor in a classroom situation. In many situations, however, this approach has proven to be less than satisfactory in that feedback during the training process to reinforce the concepts taught is entirely lacking.

In addition, in today's ever-increasing and complex technological world, it is often desired to have persons who are very highly specialized in their training and in their job functions, who nevertheless must interact with other persons who are making other decisions which must be taken into account. A highly simplified, hypothetical example of such a situation would be a situation where three individuals are monitoring and controlling various parameters of a chemical or other process, parameters such as temperature, pressure and flow rate. It will readily be imagined that a decision by one of the individuals to change a certain parameter may affect the decisions of one or more of the other individuals with respect to the parameters they control. The difficulty of training individuals who must act in such situations is compounded by the possibly deleterious or catastrophic consequences that may result from incorrect real decisions. It is thus important to impress the significance of an incorrect decision upon the individuals in a simulated situation.

By the use of a small microcomputer in conjunction with a video cassette player or videodisc player, an opportunity for a student to test his or her understanding and to obtain reinforcing feedback can be provided. The basic components of such system include a video cassette or videodisc player, a television monitor, a microcomputer and an appropriate interface between the microcomputer and the video cassette or videodisc player. The effectiveness of the system using a video cassette player with a microcomputer in order to provide interactive training has been limited by the inordinate amount of time it can take to rewind the cassette to the required position in response to a command from the microcomputer. With the recent advent of videodisc technology using a laser beam to read the recorded information on a videodisc, however, direct and automatic access to the information on a videodisc within five seconds is typically possible, thereby minimizing this problem. While providing the opportunity for interactive training, such systems using a videodisc player have limited capacities in that only a single student can use them at any one time. If many students located at different places within an industrial area are to be trained, it is often undesirable to have the students leave their work areas for the training and it would normally be troublesome, if not prohibitive, in time, cost, and possible damage to the training equipment, to move the equipment from student to student so that each student could be interactively trained in his or her own work environment. On the other hand, a costly duplication of training material and equipment would be necessary in order to provide such a training device for each student.

The present invention overcomes these problems in providing a system or network in which several students who may be remotely located with respect to one another in their working environments, are simultaneously interactively trained with a minimum of duplication of training material and equipment. In addition, in one embodiment of the present invention, the various students can interact with one another while being simultaneously trained in different aspects related to a common purpose, thereby providing a simulation of the situation in which the individuals will actually be interacting with one another while performing the functions for which they have been trained.

SUMMARY OF THE INVENTION

The interactive training system or network of the present invention provides the capability for interactively training a plurality of students at remote locations simultaneously.

In achieving this objective, the system of the present invention uses a single videodisc player to simultaneously present simulated situations to each of several student training stations located in the students' working environment and to present simulated outcomes from the students' responses to the simulated situations. Each student training station comprises a television monitor on which the students view the simulated situations and simulated outcomes and a small microcomputer with which the student indicates his or her response to the simulated situation appearing on the television monitor.

In one embodiment of the present invention, the signals from the microcomputer are provided to the videodisc player through an interface and a buffer. The buffer serially provides the different signals indicative of different student responses to the videodisc player. Each different signal causes the videodisc player to access a different portion of the videodisc on which are recorded video signals indicative of the result that would be produced by the particular response to the simulated situation presented. These video signals appear at the output of the videodisc player and are selectively, through the action of the buffer, transmitted only to the appropriate television monitors, i.e., those monitors located at the student stations at which the students have indicated the response corresponding to that result.

In a second embodiment, a video digitizer and buffer is used. Of the several possible results that have been pre-recorded as video signals, all but one are provided from the videodisc player to the video digitizer and buffer. These video signals are compressed and stored in an auxiliary memory. Thereafter, each different student response will cause either a video signal to be played on the videodisc player and applied to the appropriate television monitors or the application of a digitized video signal from the auxiliary memory to be applied through the video digitizer and buffer to the appropriate television monitors. It will readily be appreciated that with this embodiment of the present invention the different signals indicative of different results that would be produced by the particular responses of the students to the simulated situations presented may be simultaneously applied to the appropriate television monitors.

The interactive training network of the present invention may practically be used in industrial environments and buildings where electronic interference with video signals typically has deleterious effects on the quality of the images presented on remotely located television monitors since it uses fiberoptic video links to transmit the video signals to the television monitors.

Thus, with the present invention, interactive video training may be provided to the student in his or her own working environment free from electronic interference. Moreover, the ability to have many students interacting with the same video training program at the same time greatly reduces the hardware and replication costs incidental to a training system.

Another feature of the present invention is that several students may be simultaneously trained to perform different aspects of a related job and may interact with one another during their training, just as they would have to do in a real-life situation.

The novel features which are believed to be characteristic of the present invention, both as to its organization and as to its method of operation, together with further objectives and advantages thereof, will be better understood from the following description, considered in connection with the accompanying drawings in which two presently preferred embodiments of the present invention are described by way of example. It is expressly understood, however, that the drawings and descriptions are for the purposes of illustration only and are not intended as a definition of the limits of the invention.

DESCRIPTION OF THE PREFERRED EMBODIMENTS

With the present invention, a system is provided for simultaneously, interactively training students who may be remotely located from one another and from the source of the instructional material presented.

Each student is provided with a student station which comprises a television monitor and a microcomputer. Images simulating a situation to which the student is expected to react are provided by a videodisc and videodisc player to the television monitors. The student then inputs his or her reaction to the simulated situation into the microcomputer. In one embodiment of the present invention, the various different signals from the students are used by the videodisc player to access different portions of the videodisc on which are recorded video signals indicative of the simulated results corresponding to the students' reactions. A polling buffer ensures that the various signals from the students' microcomputers are serially inputted into the videodisc player to play back the appropriate recorded video signals to the appropriate students' television monitors. Additionally, the buffer gates the video link between the videodisc recorder and the television monitors so that a visual display of the simulated result arising from a student response appears only on the television monitors of the student or students who have made the particular response.

In a second embodiment of the present invention, pre-recorded signals on the videodisc corresponding to all but one of the simulated results corresponding to the students' reactions are transmitted to a video digitizer/buffer and compressor where they are converted into a digital format and then stored in an auxiliary memory. Thereafter, the various signals from the students' microcomputers cause the appropriate video signals to be applied to the students' television monitors, either by causing the videodisc player to play such signals or retrieving the appropriate signals from the auxiliary memory, converting them to analog format in the video digitizer/buffer and applying them to the appropriate students' television monitors. In this embodiment, different simulated results arising from the different student responses may appear simultaneously on the appropriate monitors of the students. Also, as will be described below, various students may be simultaneously trained to perform the related functions of a single task interactively, i.e., the different students may influence decisions of their fellow students by their own decisions.

Figure 1:
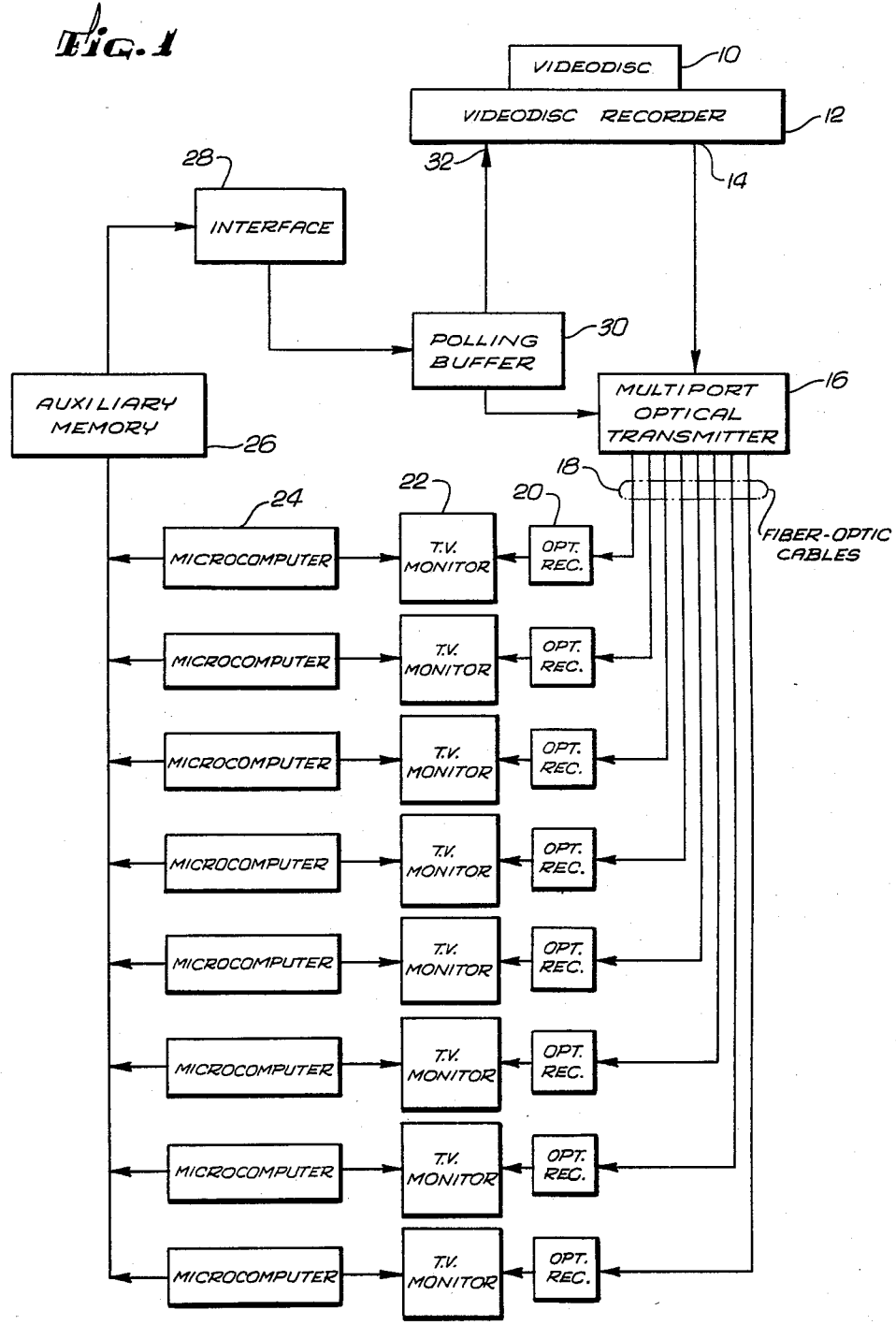
FIG. 1 is a block diagram of the major features of a first preferred embodiment of the present invention, which provides the capability of having up to 8 students interacting with the same video training program simultaneously, and in which different video sequences indicative of different student responses are serially provided to the appropriate student stations.

Referring now to the schematic diagram of FIG. 1, a first preferred embodiment of the present invention in which the ability to have up to eight remotely located students interacting with the same video training program at the same time is provided is described. The training information to be visually displayed with the interactive training network of this embodiment of the present invention is recorded on videodisc 10 for playback by a videodisc player 12. The videodisc 10 contains, embedded in it, visual information pertaining to simulated situations and simulated outcomes resulting from the students' responses to those situations as well as instructional material which is to be visually and audibly presented to the students.

The videodisc player 12 uses a low powered laser light beam to read the videodisc and to provide a video signal at the output 14 of the videodisc player 12. A significant feature of the videodisc player 12 is its ability to quickly and precisely locate any of the frames recorded on the videodisc 10 and to supply that information at the videodisc player output 14. A videodisc player suitable for use with the present invention is the Pioneer PR-7820. This videodisc player is reputed to be able to access any recorded frame on a side of a videodisc in five seconds or less. It is to be understood, however, that the system of the present invention is not limited to use with this specific videodisc player, nor is the invention to be understood to be limited to use with any of the other specifically named components herein.

The video information played by the videodisc player 12 and appearing at the output 14 is transmitted by means of a video link, which is comprised of a multiport optical transmitter 16, fiber optic cables 18, and optical receivers 20, to television monitors 22 which may be remotely located with respect to one another and with respect to the videodisc player 12. The optical transmitter 16 converts the electronic signals from the videodisc player output 14 to optical signals which are then transmitted to the television monitors 22 along the fiber optics cables 18 free from the electronic interference which often degrades electronic signals transmitted along cables. An example of such a multiport optical transmitter suitable for use with the present invention is the model MDL 2755TV manufactured by Meret, Inc. The optical receivers 20 convert the optical signals back into electronic signals for display by the television monitors 22.

In this preferred embodiment, there are eight student stations which may be remotely located with respect to one another and with respect to the videodisc player 12. Each student station includes a television monitor 22 on which the student may observe images played from the videodisc 10 by the videodisc player 12 and a small microcomputer 24. Microcomputer 24 is provided with a means for interaction with it by a student so that the student can input into microcomputer 24 his or her response to the video signals appearing on the telvision monitor 22. The memory of microcomputer 24 is programmed so that these responses are converted into the appropriate electrical signals necessary to cause the videodisc player 12 to appropriately access the videodisc 10 so that the desired video signals may be displayed on television monitor 22. The student input into the microcomputer 24 may be accomplished by means of a keyboard, a light pen, or other means. An example of a microcomputer suitable for use with the present invention is the Apple II computer, manufactured by Apple Computer, Inc.

In the event that the memory of the microcomputer 24 is not large enough to store all the information needed for the desired instruction, an external storage device or auxiliary memory 26 may be used in conjunction with the microcomputers 24.

The signals from the microcomputers 24 are provided to the videodisc player 12 through an interface 28 and a polling buffer 30. The interface 28 converts the signals from the microcomputer 24 to a level and format compatible with the videodisc player 12. Interface 28 may, in the case of the specific microcomputer and videodisc player mentioned herein be, for example, the interface designated VAI-1 manufactured by Colony Productions.

Since the remotely located students may all be responding to the images on the television monitors 22 at approximately the same time, a polling buffer 30 is used to apply the different signals from the microcomputers 24 to the videodisc player 12 serially and to correlate the resulting video signals played back by the videodisc player 12 from the videodisc 10 with the appropriate television monitors 22. Such a polling buffer as described herein may be the device designated the Corvus Constellation manufactured by Corvus Systems.

Polling buffer 30 first applies one of the different signals received from the microcomputer 24 through the interface 28 to the input or control port 32 of the videodisc player 12, storing the remaining different signals from the other microcomputers 24 temporarily in a register. The signal applied to the input or control port 32 of the videodisc player 12 causes the videodisc player 12 to access a certain portion of the videodisc 10 and to generate a video signal recorded thereon which is correlated to the signal from the microcomputer 24 and indicative of the outcome which would result from the corresponding student response.

The polling buffer 30 also determines which of the one or more microcomputers 24 has generated the signal that is being applied to the videodisc player 12 and gates the multiport optical transmitter 16 of the video link so that the signals at the output 14 of the videodisc player 12 are transmitted only to the television monitors 22 corresponding to the microcomputers 24 which originated the particular signal then being applied to the videodisc player 12.

When the polling buffer 30 determines that the video signals in response to the first of the different signals from the microcomputers 24 are no longer being transmitted to the television monitors 22, a different signal from one or more of the microcomputers 24 is applied from the register in the polling buffer 30 to the control input 32 of the videodisc player 12 through the interface 28. This signal initiates the playing of a different sequence of recorded video information on the videodisc 10. The resulting video signal is also applied only to the appropriate television monitors 22 by means of the buffer 30 appropriately gating the multiport optical transmitter 16 of the video link. After this sequence of recorded video information has been played back, the polling buffer 30 continues to apply in serial fashion the other signals originating from the microcomputers 24 to the videodisc player 12 and to apply the resulting video signals at the output 14 to the appropriate television monitors 22. After all the different signals from the microcomputers 24 have been polled, and the resulting video signals displayed, the videodisc player 12 may continue with the presentation of educational material.

Thus, in a typical mode of operation, the videodisc player 12 will display to the television monitors 22 a sequence of recorded frames of video information on the videodisc 10 which simulates a situation in which the student might find him or herself and to which he or she would be expected to react in some way. Through interaction with the microcomputers 24, the student inputs his reaction to the simulated situation appearing on the television monitors 22. The signals indicative of the different responses are applied to the videodisc player 12 serially through the action of the polling buffer 30 so that video signals indicative of the simulated results of the students' various responses are serially applied to the appropriate television monitors 22. Because the videodisc player 12 is capable of accessing any portion of the videodisc 10 in five seconds or less, all the students may be provided with feedback almost immediately after making their responses, thus helping to ensure that the learning process is successful.

Figure 2:
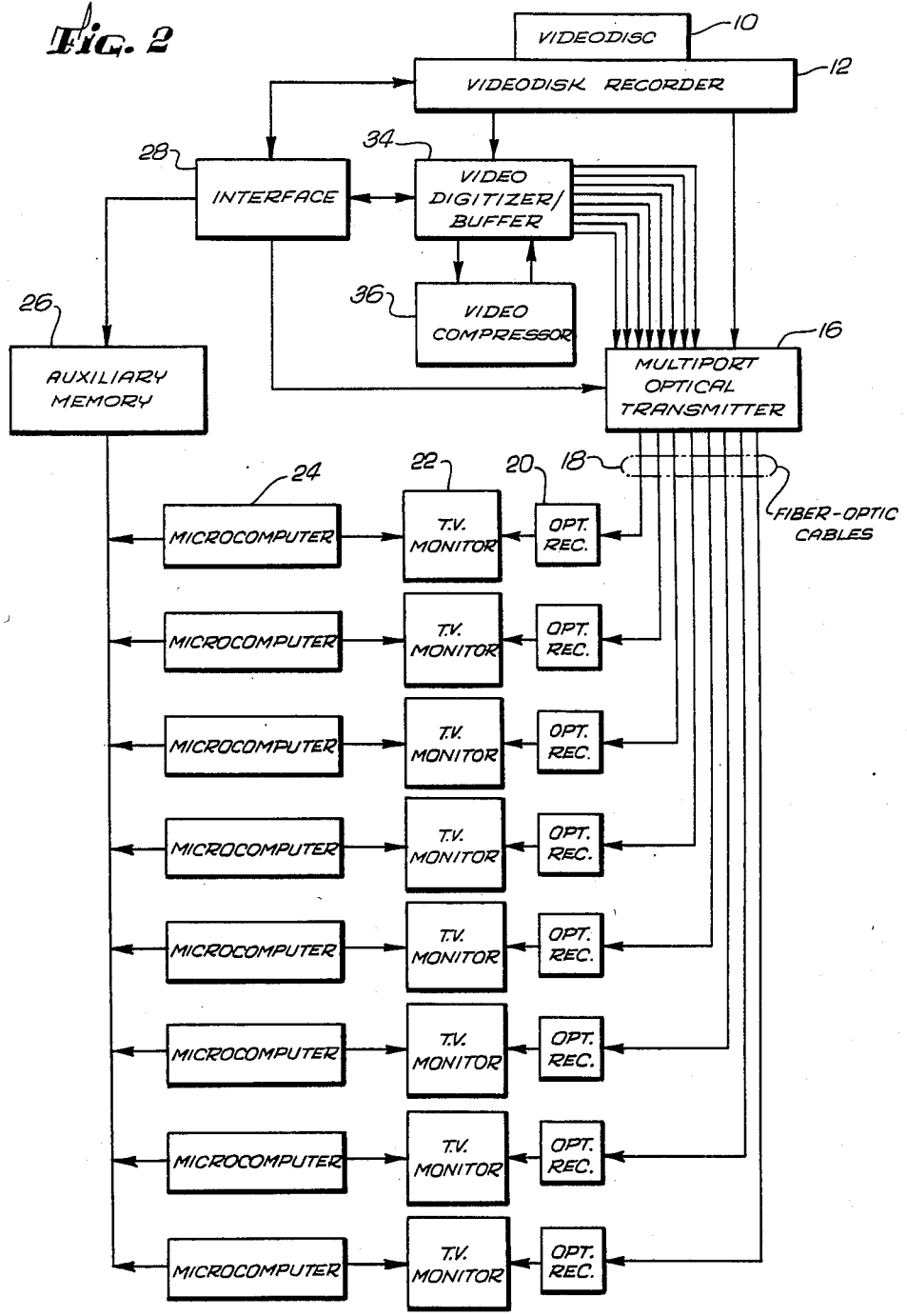
FIG. 2 is a block diagram of the major features of a second preferred embodiment of the present invention, which provides the capability of having up to 8 students interacting with the same video training program simultaneously, and in which different video sequences may be simultaneously presented to different student stations.

Referring to the schematic diagram of FIG. 2, a second preferred embodiment of the present invention is described. This embodiment is similar to the first preferred embodiment, and the description below emphasizes mainly the differences between the two embodiments. In this embodiment polling buffer 30 of the first preferred embodiment is replaced by a video digitizer and buffer 34 and a video compressor 36. In addition, in the schematic diagram of FIG. 2, the paths for various signals are different from those shown in FIG. 1. By the integration of a video digitizer and buffer 34 and video compressor 36 controlled along with the videodisc player 12 by the microcomputer software, different video sequences can be displayed simultaneously at each student's television monitor. The administrative software controlling the operation of this system may be programmed into one of the microcomputers 24 which, in addition to serving a student and being interfaced with a television monitor 22, serves as a lead computer. Auxiliary memory 26 may also be used in conjunction with the lead microcomputer 24. With microcomputers other than the Apple II, the designation of a lead microcomputer 24 may be unnecessary, depending on the capabilities of the microcomputers 24.

The simultaneity of the display of different video sequences to the different television monitors at the same time is accomplished through use of the video digitizer and buffer 34, video compressor 36, and auxiliary memory 26 with the other components described. The principle of operation of this system can be understood with respect to a description of an initial training sequence. Prior to the beginning of the presentation of a video sequence to the television monitors to which the individual students are expected to respond the sequences which correspond to the various possible simulated results from those responses are prerecorded as video signals on the videodisc and with the exception of one, are transmitted by the videodisc recorder to the video digitizer and buffer 34. There they are converted from analog to digital format. An example of a video digitizer and buffer which may be used is the Digivision DRGB 343 high resolution digital converter. A video compressor, 36, by comparison of successive frames of the digitized video information and other techniques well known, reduces the amount of information which must be stored in order to preserve the particular pre-recorded video sequence. The digitized and compressed pre-recorded video signals are then applied through interface 28 to the auxiliary memory 26.

As each student makes his or her response to the prerecorded video sequence of a simulated situation, the signal generated by the student's microcomputer 24 will cause either the pre-recorded video signal which has not been digitized, compressed and stored in auxiliary memory 26 to be played by videodisc player 12, or will cause one of the digitized, compressed and stored video sequences to be retrieved from the auxiliary memory 26 and applied through interface 28 and the video digitizer and buffer 34 where the digitized video sequence is converted to a standard analog video signal and appropriately applied to the multiport optical transmitter 16 for transmission to the appropriate television monitor 22. The multiport optical transmitter 16 is controlled by signals applied through the video digitizer and buffer 34 and interface 28 from the microcomputers 24. Since in this embodiment each of the simulated results of the various students' responses are simultaneously available to be displayed on the television monitors 22 either from the videodisc player 12 or the auxiliary memory 26, simultaneous, rather than serial presentation of the various results of the students' responses is possible.

One of the microcomputers 24 may be designated as a lead or supervisory microcomputer, and loaded or programmed with administrative software to control the digitization and storage of the recorded video signals and the application of selected video sequences to the television monitors 22. In the present embodiments described in which the Apple II microcomputers are used, any of the 8 microcomputers 24 may be selected as lead or supervisory microcomputers. By means of this software, the microcomputer 24 selected as the lead or supervisory microcomputer appropriately causes the videodisc player to transmit the appropriate video sequences to either the video digitizer and buffer 34, or, through the multiport optical transmitter 16, to the television monitor 22. The video digitizer and buffer 34 is caused by the administrative software, through the interface 28, to control the multiport optical transmitter 16 so that the appropriate video sequences, be they either from the auxiliary memory 26 or the videodisc player 12, are displayed to the appropriate television monitors 22.

Once each of the students has responded to a presented situation on television monitor 22 and the appropriate simulated resulting situations from pre-recorded video signals either on the videodisc 10 and/or stored in the auxiliary memory 26 have been displayed on the television monitors 22, the digitized, compressed video signals stored in the auxiliary memory 26 are cleared on command from the lead microcomputer in order to allow for storage of digitized, compressed, pre-recorded video signals indicative of the simulated situations resulting from possible successive responses of the students.

With the second preferred embodiment in which information from the videodisc is digitized, compressed and then stored in auxiliary member 26, it will be appreciated that with suitable software and sufficient auxiliary memory, the system will enable each student to progress at his own pace. The auxiliary memory 26 would continue to store the digitized, compressed video signals indicative of a simulated situation until the last student has made his response for which such signals represent the simulated results which should be displayed to the television monitor 22. At that point, such signals would be erased.

An additional capability of the second preferred embodiment of the present invention is the ability for students to interact with one another and to alter the decisions of their fellow students. A simplified example of the circumstances in which such a capability might be of value is a situation where different persons are being trained to regulate and monitor different aspects of a system in which the choice by one person influences the possible choices by other persons. In particular, a simplified, hypothetical example might be where three persons are monitoring different parameters of a chemical process, e.g., temperature, pressure and flow rate. It could be imagined that the selection of a certain flow rate by one person would influence the selection of temperature or pressure by either of the two other persons. It could further be imagined that it may be desirable to train persons whose tasks are to include the regulation of such in a simulated situation in order to avoid possibly costly and catastrophic results of incorrect choices by such person. With the present invention, this can be achieved. For example, if a first student, in response to a presented situation would be given choices 1, 2, or 3 and a second student in response to the same situation would be given the choices 4, 5, or 6, the selection by the second student of choice 4 could preclude the first student from making choice 3, leaving the first student with a selection between choice 1 or choice 2.

While the interactive training network of the present invention has been described in terms of a specific preferred embodiment, it will be recognized that many variations of the invention which may be suitable for particular situations are within the scope of the invention. For example, as has already been noted, with respect to the first preferred embodiment, it may or may not be desirable to include an auxiliary memory 26 to augment the memories of the microcomputers 24.

As another example, with respect to the second preferred embodiment, it may be desirable to digitize, compress and store all the pre-recorded video signals indicative of the results of various responses, and/or the pre-recorded video signals indicative of the situations to be presented to the students in order to allow the students to proceed at their own pace. This, of course, can be accomplished through the selection of appropriate microcomputers 24 and software for use with the microcomputers 24.

I claim:

1. A video training system for simultaneous interactive use by a plurality of students, said system using video sequences recorded on videodisc, said sequences reflective of response evocative information indicative of the results of possible evoked responses, said system comprising:

a plurality of student stations, each station for use by a student and comprising a television monitor for application thereto of said recorded video sequences and a corresponding microcomputer operable by said student to generate a microcomputer output signal in response to response evocative information displayed on said television monitor, said microcomputer output signal corresponding to recorded video sequence indicative of the results of one of the possible evoked responses:

a videodisc player coupled to said plurality of student stations for applying to said television monitors video sequences recorded on a single videodisc played by said player;

a multiport transmitter means connected to said television monitors and said video player for applying recorded video sequences played by said player to said television monitors, said means controllable to apply selected recorded video sequences to selected television monitors; and a control system coupled to said multiport transmitter means and to said videodisc player for controlling the application of video sequences to said television monitors, said control system responsive to said microcomputers and said microcomputer output signals so that video sequences reflective of information indicative of the results of evoked responses are applied to the television monitors corresponding to the microcomputers which have been operated by said students to generate the corresponding microcomputer output signals shortly after such microcomputer output signals have been generated, said control system comprising:

a video digitizer connected to said videodisc player for converting video sequences recorded on said videodisc and played by said videodisc player into digitized video signals;

a video compressor coupled to said digitizer for compressing said digitized video signals;

a computer memory coupled to said video compressor for storing compressed digitized video signals;

digital to analog converting means coupled to said memory and to said multiport transmitter means for converting digitized video signals stored in said memory into analog video signals for application through said multiport transmitter means to said television monitors; and wherein said control system causes said videodisc player to play sequences indicative of the results of possible evoked responses into said video digitizer for conversion into digitized video signals, to compress those signals in said video compressor, to store those signals in said computer memory, and thereafter to apply those stored, compressed, digitized signals through said digital to analog converting means through said multiport transmitter means to said television monitors corresponding to the microcomputers which have been operated by said students to generate the corresponding microcomputer output signals, any of said stored compressed digitized video signals being so applicable to any of said television monitors whereby different signals are simultaneously applied to different television monitors when said students simultaneously operate said microcomputers to generate different microcomputer output signals.

2. A video training system as in claim 1 wherein said multiport transmitter means comprises:

a multiport optical transmitter having an input connected to said digital to analog converting means and an input connected to said videodisc player, said multiport transmitter means having an output corresponding to each television monitor, said multiport optical transmitter controllable by said microcomputers for selectively applying played video sequences at said inputs to selected outputs, said multiport optical transmitter converting video sequences from electrical signals into optical signals;

optical to electrical converting means located at and coupled to each said television monitor for converting optical video signals to electrical video signals displayable on said television monitor; and a fiber optic cable connecting each output of the multiport optical transmitter with said optical to electrical converting means coupled to the television monitor corresponding to said output.

3. A video training system for simultaneous interactive use by a plurality of students, said system using recorded video sequences reflective of instructional material to which said students may differently respond and instructional material corresponding to said students' possible different responses, said system comprising:

a videodisc player for playing recorded video sequences of instructional material recorded on a videodisc;

a plurality of student stations, each comprising a television and a microcomputer, said televisions coupled to said videodisc player for displaying recorded video sequences of instructional material from said videodisc played by said videodisc player, said microcomputer registering a response to said displayed instructional material and causing instructional material corresponding to said response to be displayed on said corresponding television;

a video digitizer responsive to one or more of said microcomputers for converting selected video sequences on said videodisc played by said player into digitized electronic signals, said selected video sequences including those reflective of instructional material corresponding to said students' possible different responses;

a video compressor for compressing said digitized electronic signals coupled to said video digitizer;

a memory for storing said compressed, digitized electronic signals, said memory accessible by each of said microcomputers;

digital to analog converting means coupled to said memory and to said televisions for converting said stored digitized electronic signals into analog signals for application to said televisions; and a multiport transmitter means connected to said televisions, said player and said digital to analog converting means for selectively applying signals from said digital to analog converting means and from said player to said television, said multiport transmitter means responsive to said microcomputers, whereby different recorded video sequences corresponding to different possible responses may be simultaneously applied to said corresponding televisions, said memory and said microcomputers being coupled so that any of said stored digitized electronic signals are accessible for application to any of said televisions.

4. A method for simultaneously training a plurality of students using a videodisc on which has been recorded sequences of instructional material, said sequences including information to which one or more of said students is to respond as well as information corresponding to different possible responses of said students, said method comprising:

playing on a videodisc player a recorded video sequence from said videodisc corresponding to a sequence of instructional material to which a student is expected to respond;

causing said played video sequence to be displayed on television monitors corresponding to each student;

playing at least some of the recorded video sequences on said videodisc corresponding to possible responses of said students and converting said sequences into digital electronic signals, compressing said signals and storing them in a memory;

generating a signal indicative of each student's responses to said sequence of instructional material in a microcomputer provided for each student corresponding to each television; and providing said generated signals selectively to said memory and said videodisc player to cause the recorded video signals corresponding to said students' responses to be applied to said corresponding televisions from either said memory or from said videodisc player playing said videodisc.

5. A method as in claim 4 wherein the step of generating a signal occurs after the step of converting said sequence into digital electronic signals, compressing them and storing them in a memory, whereby said recorded video signals corresponding to said student responses are applied to said corresponding televisions almost immediately after the corresponding signals have been generated in said microcomputers.

* * * * *